Nov. 13, 1956 — D. ERNST — 2,770,048
GEAR WHEEL TESTING INSTRUMENT
Filed Oct. 1, 1953 — 2 Sheets-Sheet 1
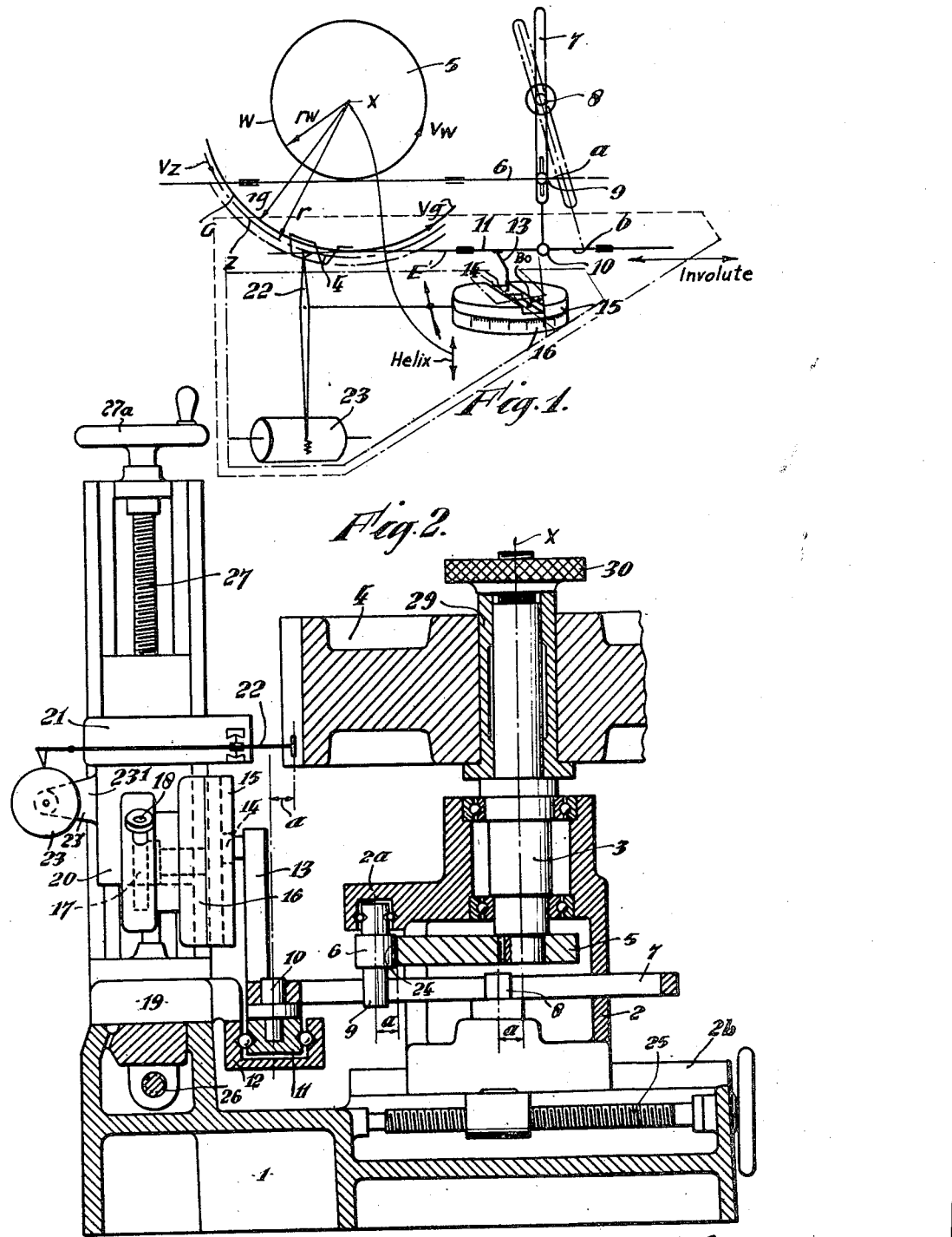

Nov. 13, 1956  D. ERNST  2,770,048
GEAR WHEEL TESTING INSTRUMENT
Filed Oct. 1, 1953  2 Sheets-Sheet 2

Daniel Ernst.
By Churchill, Rich, Weymouth & Engel
Attys

United States Patent Office 2,770,048
Patented Nov. 13, 1956

2,770,048

GEAR WHEEL TESTING INSTRUMENT

Daniel Ernst, Zurich, Switzerland, assignor of one-half to Maag Gear-Wheel and Machine Company, Limited, Zurich, Switzerland, a body corporate of Switzerland Application October 1, 1953, Serial No. 383,624

6 Claims. (Cl. 33—179.5)

This invention relates to an instrument for testing the accuracy of the helical profile and involute faces of the flank faces of the teeth of helical gear wheels with a feeler.

In a known instrument of this type, the wheel to be tested is mounted on a shaft (arbor) which is provided with a cylindrical disc hereinafter termed "the generating cylinder" which is rolled along a straight track. This rolling movement is necessary for testing both the involute profile and the helical faces and may be produced either by rolling the generating cylinder along a straight axial line sloped by the helix angle or by moving this straight line tangentially to the generating cylinder. Whilst in this known form of instrument the helical profile of gear wheels of differing characteristics may be tested with a single generating cylinder of any suitable diameter within the size of the toothed wheel, the testing of the involute profile requires the generating cylinder to be changed for every change of the involute form since the generating cylinder diameter had to be equal to the base circle diameter of the involute profile.

Furthermore there are also devices known for testing only the involute faces which use a rolling generating cylinder of any suitable size in combination with a lever system which reduces and transfers the turning movement of the rolling disc to the measuring device in the ratio of the diameters of the base circle of the gear wheel under test and of the generating cylinder.

One of the objects of the present invention is to provide an instrument which using a single rolling generating cylinder can be used for testing both the involute faces and helical profiles of the teeth of a range of toothed wheels differing in diameter of base circle and helix angles.

According to the present invention and instrument for testing both the helical profile and involute faces of a helical gear wheel tooth of involute form comprises on a frame, a feeler adapted to contact the tooth to be tested, a turnable shaft adapted to receive the gear wheel to be tested, a generating cylinder on said shaft, a first slide assembly one member of which is operatively associated with said generating cylinder and relatively movable parallel to a tangent to said generating cylinder, a pivot on said slide member, means for providing a relative rolling relation of said generating cylinder on said tangent as said slide member is moved, a second slide assembly one member of which is relatively movable parallel to the first slide member in spaced relation thereto, a pivot on said second slide member, a third slide assembly angularly adjustable relative to the axis of said shaft to an angle equal to the particular helix angle of the helical tooth being tested, said third slide assembly being provided with one member which is operatively associated with said relatively movable member of said second slide assembly and with another member which is operatively associated with said feeler, indicator means associated with said feeler, means for providing relative movement between said third slide assembly and said shaft to bring the point of said feeler onto a line tangential to the base circle of the gear wheel to be tested, said frame being provided with a main pivot spaced a fixed distance from said shaft, a pivoted lever of adjustable length carried on said main pivot and on the pivots on the first and second slide members to provide operative association of said slides and shaft whereby the ratio of the arms of said lever when the point of the feeler is located on the base circle is always in the ratio of the radius of the generating cylinder to the base circle of the gear respectively, means for moving said feeler and associated third slide member in a plane parallel to the axis of said shaft whereby the point of said feeler is moved along a helical tooth contour of the tooth to be tested and means for moving said slide members parallel to said first and second tangent whereby the point of said feeler is moved along an involute contour of the tooth to be tested, departure from the true contour being indicated by said indicator means. The pivotal axis of said lever may be fixed relative to the axis of said shaft and the second slide movable with the feeler axis for movement of the feeler over the tooth profile.

Referring to the drawings filed herewith:

Fig. 1 is an operational skeleton diagram of the apparatus shown in Figures 2 and 3.

Fig. 2 is a part sectional elevation.

Figure 3:
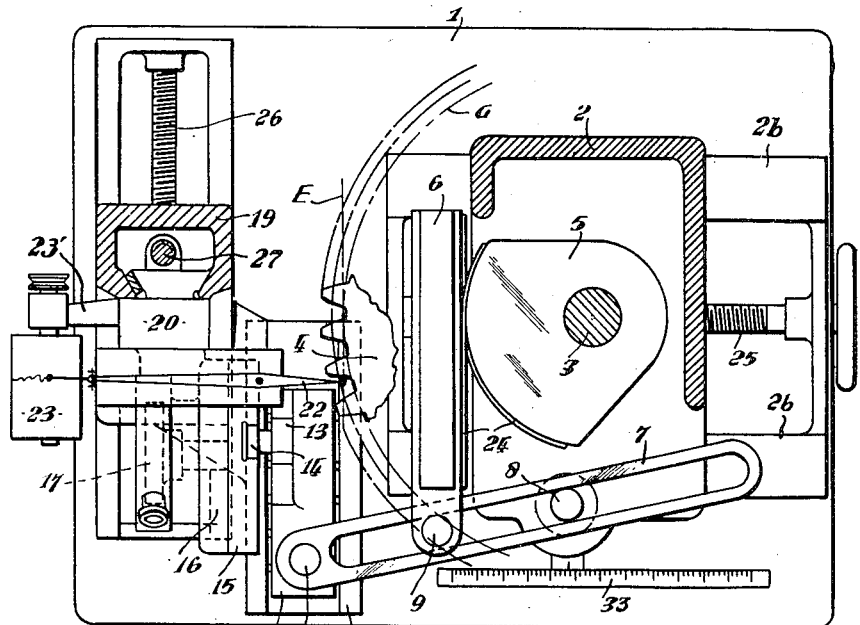

Fig. 3 a plan view of one form of testing instrument made in accordance with the present invention.

Figure 4:
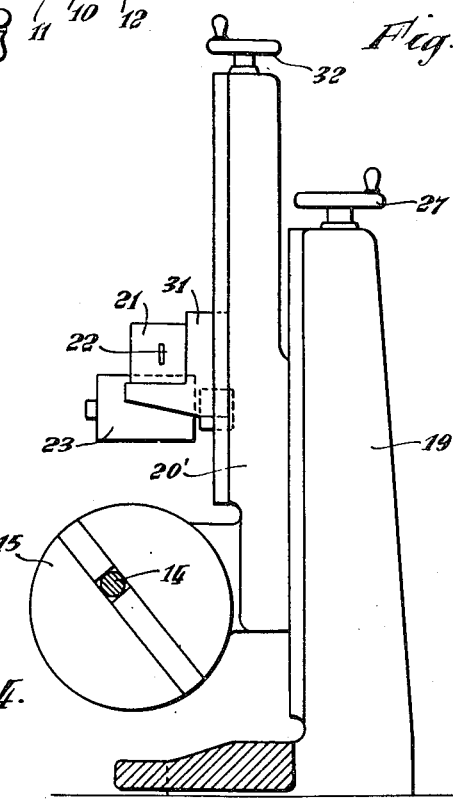

Fig. 4 is an elevation of a modified form of instrument showing a different arrangement of the tracer on the carrier of the guide track.

In the theoretical diagram shown in Fig. 1, the helically toothed gear wheel 4 to be tested is assumed to be approximately twice the size of the rolling generating cylinder 5. A feeler 22 which contacts the helical tooth and whose movements are to be recorded on a drum 23 is rigidly connected with the carrier 16 of a grooved disc 15 mounted for angular adjustment about its axis. The grooved disc 15 is set so that its groove makes an angle $B_0$ to the gear wheel axis X, $B_0$ being the helix angle of the helical tooth of said gear wheel at the base circle G. A sliding block 14 is carried on a slide 11 to which a lever 7 is connected by the pivot 10 said lever 7 being pivotally mounted on a stationary pin 8 mounted on the slide that carries the gear wheel 4 and generating cylinder 5. On the lever 7 being swung about the pin 8 a pivot 9 connected to and guided by the side of straight member 6 which is tangentially and rollingly engaged with the generating cylinder 5, moves the straight member 6 and thereby imparts a turning movement to the generating cylinder. The longitudinal axis $E'$ of the slide 11 passes through both the point of the feeler 22 and the axis of the pin 10; it represents the path of contact of the feeler 22 and is a tangent to the base circle G.

In Fig. 1

$r$ is the radius of any circle of the gear 2 which is concentric with the addendum circle and at least equal to the base circle of the gear wheel $R_w$ is the radius of the generating cylinder 5

$r_g$ is the radius of the base circle of the gear 4

$a$ is the amount of movement of the straight member 6

$b$ is the amount of movement of the slide 11

$V_w$ is the amount of the rotary movement corresponding to straight line movement $a$ $V_g$ is the amount of rotary movement corresponding to the straight line movement of $b$ for the angles of approach or recess of the gear wheel and varies according to the length and pitch angle for each gear wheel to be tested $Z$ is any circle of the radius $r$ of the gear $V_z$ is the amount of rotary movement of circle Z for the angles of approach or recess of the gear wheel and varies according to the length and pitch angle for each gear wheel to be tested From the foregoing it is apparent $$\frac{r_w}{V_g} = \frac{a}{b} = \frac{V_w}{V_g}$$

i. e. the rotary motions of the circles W and Z correspond to the straight line movements $a$, $b$ of the lever pivots 9, 10 respectively, and also correspond to the diameters of the circles 4 and 5. The following (equation) applies to the rotary motion $V_z$ of any circle Z:

$$\frac{V_z}{V_w} = \frac{r}{r_w}$$

When therefore the gear wheel 4 is set so that the line of movement E' of the slide 11 is tangential to the base circle G of the gear teeth, the feeler 22 with the grooved disc 15, 16 is shifted in a plane parallel to the wheel axis X, the groove being set obliquely to X at the helix angle $B_0$ of the helix, the feeler point follows always a helical line on the flank of the tooth irrespective of the diameter of the circle Z on which it is situated.

If the wheel axis X and the pivot pin 8 are displaced laterally whilst the grooved disc 15, 16 and the feeler 22 remain fixed in space then the rolling generating cylinder W rolls along the straight line 6, and a tooth profile slides over the feeler 22 which records its deviations from the involute shape.

A constructional embodiment of the testing instrument according to the present invention is shown by way of an example in Figs. 2 and 3. A slide 2 is slidably supported in guides 2b on a bed 1 and carries the shaft 3 on which the toothed wheel 4 to be tested is shown mounted. The stationary pivot pin 8 of a lever 7 is also mounted on the slide 2 which has further a guide track 2a in which a pin 9 on a straight slidable part 6 slides on ball bearings, said part having connected thereto bands 24 by which it is connected to a segmental generating cylinder 5 mounted on the lower end of the shaft 3 and said straight slidable part constitutes the rolling straight line 6 of Fig. 1. The slidable part 6 carries in addition the pin 9 which in the same way as the pivot 8 engages in the longitudinal groove of the lever 7 whose end is pivotally mounted on a pin 10 mounted on a second slide 11 arranged for movement parallel to that of the slidable part 6. By means of the lead screw 25 the slide 2 and with it the wheel 4 can be adjusted in relation to the feeler 22 until the path of contact E (Fig. 3) is tangential to the base circle G. When this occurs the value $V_g$ is indicated on the graduated scale 33 secured to the bed 1. The axes of the pins 8, 9 and 10 are for constructional reasons (as shown in Fig. 2), each displaced from the centre of the wheel 4 and from the generating cylinder 5 and from the point of the feeler 22 respectively by the distance $a$. The block 14 which engages in the grooved disc 15 is connected with slide 11 by a stiff arm 13, said slide 11 engaging in a guide 12, which is carried on a horizontal slide 19 on the vertical part of which another vertical slide 20 is slidingly mounted.

The slides 19 and 20 get their movement from leadscrews 26, 27. These leadscrews 26 and 27 may be operated by hand wheels 27a, 28 adapted to be coupled to either or both through a suitable changeable coupling (not shown). Manual drive may be replaced by a mechanical drive such as that of a motor (not shown). The slide 20 carries a feeler housing 21 and the carrier 16 of the grooved disc 15. A recording drum 23 is mounted on the slide 20 by means of bracket 23'. The recording drum 23 is driven by means of a device (not shown) to indicate results of tests of either involute profile or helical face as described infra. If the leadscrews 26, 27 have a common drive the recording drum is connected therewith. The exact setting of the grooved disc 15 to the helix angle of the teeth is achieved by means of a precision graduated circular scale 17 which is connected therewith, and which is situated in the casing of the carrier 16. The angle is read by means of a microscope 18.

The toothed wheel 4 to be tested is positioned on a tightly fitting sleeve 29 (see Figure 2) which is turnably mounted on the shaft 3 but adapted to be rigidly clamped thereto by means of a knurled nut 30. In order to lay the feeler 22 onto a new tooth the screw 30 is loosened and the feeler is brought out of engagement whereupon the wheel 4 can be turned on the shaft 3.

The modification shown in Fig. 4 consists in mounting the feeler housing 21' together with the recording drum 23' rigidly on a separate carrier 31 which in turn is slidably carried on the slide 20' and movable parallel to the wheel axle X by means of the hand wheel 32.

For the purpose of producing the rolling movements described above another member can represent the stationary element of the system e. g. the slide 19, the slide 2 being then adjustable parallel to the rolling straight line (track) 6. Another possible modification would be to arrange that the slide 11 is at times the driving means both of the lever 7 and the grooved disc 15. Finally the relative feed adjustment of the test sample and of the feeler can be effected by a movement of the slide 19 perpendicularly to the rolling straight line 6.

Assuming that the machine has been set up and adjusted as shown in Figs. 2 and 3, to test a gear wheel the testing operation is carried out as follows:

In order to test the accuracy of helical profile of the tooth on any helical line at the radius Z the feeler 22 is brought into contact with a tooth face preferably at one end thereof and adjustments made to bring the point of the recorder into coincidence with a zero line on chart on the drum 23. The leadscrew 27 is then operated by its handle 27a to cause the feeler 22 to move across the tooth face. As the slide 21 moves upwardly or downwardly according to which end of the tooth the start is made from, the lever 7 will be rocked about the pivot 8 by the action of the disc 15 moving relatively to block 14. This rocking movement of the lever 7 moves the bands 24 to rotate the generating cylinder 5 in correct relation to the helix angle $B_0$ of the helix. It will be understood that during this movement the contact point of the feeler 22 is at all times located at the same radius Z because no movement has been made on the slide 19 on the bed 1. If the helical profile has been correctly machined the recording point of the feeler 22 will not be displaced from the zero line and a straight line will be drawn on the chart. Any deformation or departure from the true helical line will be indicated by a relative displacement of the recording point.

In order to test the involute profile alone at any point in the length of the tooth flank the leadscrew 27 is held stationary and the wheel 28 is turned driving the leadscrew 26 so that the slide 19 moves along the bed 1. Referring to Fig. 2, wheel 28 is turned to move slide 19 outwardly in the bed 1. This movement carries the disc 15 in the same direction and the block 14 connected with the lever 7 through the arm 13 rocks the lever 7 and imparts a rotation to the generating cylinder 5. During the movement of the slide 19 on the bed 1 the feeler 22 moves over the involute curve on the tooth flank. Again assuming that the recording point has been correctly set on the drum 23 at the start of the movement any displacement from the zero line on the chart located on the drum 23 will indicate a departure from the true involute profile.

In Fig. 1 the portion of the mechanism which is operative in testing the involute is shown enclosed within the dash lines and the portion of the mechanism which is operative in testing the helix angle is shown enclosed within the dot and dash lines.

The slide 31 (Fig. 4) enables the machine to be used for testing gear wheels already mounted or formed on shafts which extend beyond the limits of the teeth. In the case of helical teeth it also provides a ready means of bringing the point of the recorder into coincidence with the zero lines on the chart on the drum 23.

What I claim and desire to secure by Letters Patent is:

1. An instrument for testing both the helical profile and involute face of a helical gear wheel having teeth of involute form, comprising a feeler adapted to contact the face of the tooth to be tested, a turnable shaft adapted to carry the gear wheel to be tested and a generating cylinder mounted on said shaft; a first slide assembly operatively connected with said generating cylinder and having a straight slide member movable parallel to a tangent line to said generating cylinder, a pivot on said straight slide member, and means for providing a relative rolling relation to said generating cylinder on said tangent line as said slide member is moved; a second slide assembly having a second slide member which is relatively movable parallel to the slide member of the first slide assembly in spaced relation thereto, and a pivot on said second slide member; a third slide assembly having a first member angularly adjustable relative to the axis of said shaft to an angle equal to the helix angle of the helical tooth to be tested, said third slide assembly being provided with a further member, said further member and said second slide member of said second slide assembly being provided with slider means interconnecting said third assembly with said second assembly, said third assembly being provided with another member which is operatively connected with said feeler; indicator means operatively connected and cooperating with said feeler for indicating any departure from the true contour of the tooth being tested; means for providing relative movement between said third slide assembly and said shaft to bring the point of said feeler in contact with the flank of the tooth to be tested; a pivoted lever of variable effective length mounted on a main pivot disposed in fixed parallel relation to said shaft and on the pivots of the first and second slide members and slidably pivoted on at least two of said pivots to provide an operative connection between said slide members and shaft, whereby the ratio of the arms of said lever when the point of the feeler is located on the base circle is always in the ratio of the radii of the generating cylinder and base circle respectively; means for providing movement of said feeler and of said third slide assembly in a plane parallel to the axis of said shaft and cooperating with said slider means whereby the point of said feeler is moved along a helical tooth contour of the tooth to be tested; and means for moving said third slide assembly parallel to said tangent line to said generating cylinder whereby the point of said feeler is moved along an involute contour of the tooth to be tested.

2. An instrument according to claim 1, wherein the means for providing relative movement between the third slide assembly and said shaft comprises a fourth slide assembly, the slidable member of which carries the shaft, the main pivot and the first slide assembly.

3. An instrument according to claim 1, wherein means are included for providing angular adjustments and clamping of said gear wheel against rotation on said shaft.

4. An instrument according to claim 1, wherein means are provided for moving said feeler parallel to said shaft relatively to said angularly adjustable slide.

5. An instrument according to claim 1, wherein the means for providing relative movement between the third slide assembly and said shaft comprises a fourth slide assembly, the slidable member of which carries the shaft, the main pivot and the first slide assembly, and means for providing angular adjustment and clamping of said gear wheel against rotation on said shaft.

6. An instrument according to claim 1, wherein the means for providing relative movement between the third slide assembly and said shaft comprises a fourth slide assembly, the slidable member of which carries the shaft, the main pivot and the first slide assembly and wherein means are provided for moving said feeler parallel to said shaft relatively to said angularly adjustable slide.

References Cited in the file of this patent

UNITED STATES PATENTS

| | | |
|---|---|---|
| 1,884,368 | Swain | Oct. 25, 1932 |
| 2,013,365 | Snarry | Sept. 3, 1935 |
| 2,313,133 | Ernst | Mar. 9, 1943 |
| 2,673,401 | Bradner | Mar. 30, 1954 |

FOREIGN PATENTS

| | | |
|---|---|---|
| 637,563 | Germany | Oct. 30, 1936 |
| 257,133 | Switzerland | Apr. 1, 1949 |